United States Patent
Lintum

(10) Patent No.: US 8,341,181 B2
(45) Date of Patent: Dec. 25, 2012

(54) METHOD FOR PERFORMANCE TUNING A DATABASE

(75) Inventor: Wim te Lintum, Schiphol-Rijk (NL)

(73) Assignee: Unisys Corporation, Blue Bell, PA (US)

( * ) Notice: Subject to any disclaimer, the term of this patent is extended or adjusted under 35 U.S.C. 154(b) by 250 days.

(21) Appl. No.: 12/908,917

(22) Filed: Oct. 21, 2010

(65) Prior Publication Data

US 2012/0101984 A1    Apr. 26, 2012

(51) Int. Cl.
 G06F 7/00    (2006.01)
 G06F 17/30   (2006.01)
(52) U.S. Cl. .................................. 707/790; 707/781
(58) Field of Classification Search ............... 707/781, 707/790

See application file for complete search history.

(56) References Cited

U.S. PATENT DOCUMENTS

| | | | |
|---|---|---|---|
| 6,230,220 B1 * | 5/2001 | Cohen et al. ............... | 710/52 |
| 6,785,684 B2 * | 8/2004 | Adbo ........................ | 707/693 |
| 7,225,211 B1 * | 5/2007 | Colgrove et al. .......... | 707/693 |
| 7,757,063 B2 * | 7/2010 | Kuczynski et al. ........ | 711/170 |
| 7,788,449 B2 * | 8/2010 | Karn et al. ................ | 711/118 |
| 7,805,706 B1 * | 9/2010 | Ly et al. .................... | 717/121 |
| 7,809,693 B2 * | 10/2010 | Lango et al. ............... | 707/679 |
| 8,161,038 B2 * | 4/2012 | Shen et al. ................. | 707/718 |

* cited by examiner

*Primary Examiner* — Charles Lu
(74) *Attorney, Agent, or Firm* — James E. Goepel

(57) ABSTRACT

A method for performance tuning a database is described. The method includes setting a database-allowed core value between 500 megabytes and half size of memory for the database. Further, the method declares small and heavily accessed structures as memory resident structures, and sets a memory resident limit value between 0 and the database-allowed core value for the database. In addition, the method analyzes the database to determine whether read-ahead should be enabled for the data structures. The method also analyzes the database to apply a reblocking factor between 1 and 60. The method associates system buffers ranging from 1000 to 20000 with the data structures, and stores the system buffers in memory. Moreover, the method consolidates the data structures having unused space.

19 Claims, 4 Drawing Sheets

METHOD FOR PERFORMANCE TUNING A DATABASE

FIELD

This application deals generally with the field of database management, and more specifically with database optimization.

BACKGROUND

Performance is a critical attribute of database systems. High performance database systems are vital for commercial success, especially for companies working on time-critical and sensitive data, such as healthcare and financial firms. Customer orders must be processed quickly, and inventory must be identified and assigned to a respective order. With systems getting bigger and databases becoming more complex every year, better database performance has become a prominent issue.

Database performance depends on a number of factors. The most important factors include computing hardware, applications, workload, and system/database parameters. Slight alteration of one parameter can have a significant effect on performance. For instance, increased memory capacity can be efficiently used to optimize performance. In addition, database performance parameters are typically interdependent, so that tuning one parameter modifies the value and/or effectiveness of others.

Certain existing techniques attempt to optimize database performance by tuning a subset of the database parameters. These techniques involve significant investment in both money and people. Moreover, present techniques do not employ efficient utilization of memory capacity available to database systems. It should be apparent that an inefficient database results in a large amount of input/output (I/O) activity and a high response time.

SUMMARY

At present, there remains a need for a database performance tuning technique that efficiently utilizes memory capacity to reduce the number of input/output requests and the response time for transaction and batch processing, thereby optimizing the performance of the database.

The present disclosure describes a method for performance tuning a database. The method sets a database-allowed core value between 500 megabytes and one-half of available memory for the database. Further, the method declares small and heavily accessed data structures as memory resident structures, and sets a memory resident limit value between 0 and the database-allowed core value. In addition, the method analyzes the database to determine whether read-ahead should be enabled for the data structures. The method analyzes the database to apply a reblocking factor between 1 and 60. The method also associates system buffers ranging from 1000 to 20000 with the data structures, and stores the system buffers in memory. Moreover, the method consolidates the data structures having unused space.

These and other advantages, features, and objects of the claimed disclosure will become apparent upon review of the following detailed description of the preferred embodiments when taken in conjunction with the drawings and the appended claims.

BRIEF DESCRIPTION OF THE DRAWINGS

The figures set out and illustrate a number of exemplary embodiments of the disclosure. Throughout the figures, like reference numerals refer to identical or functionally similar elements. The figures are illustrative in nature and are not drawn to scale.

Figure 1:
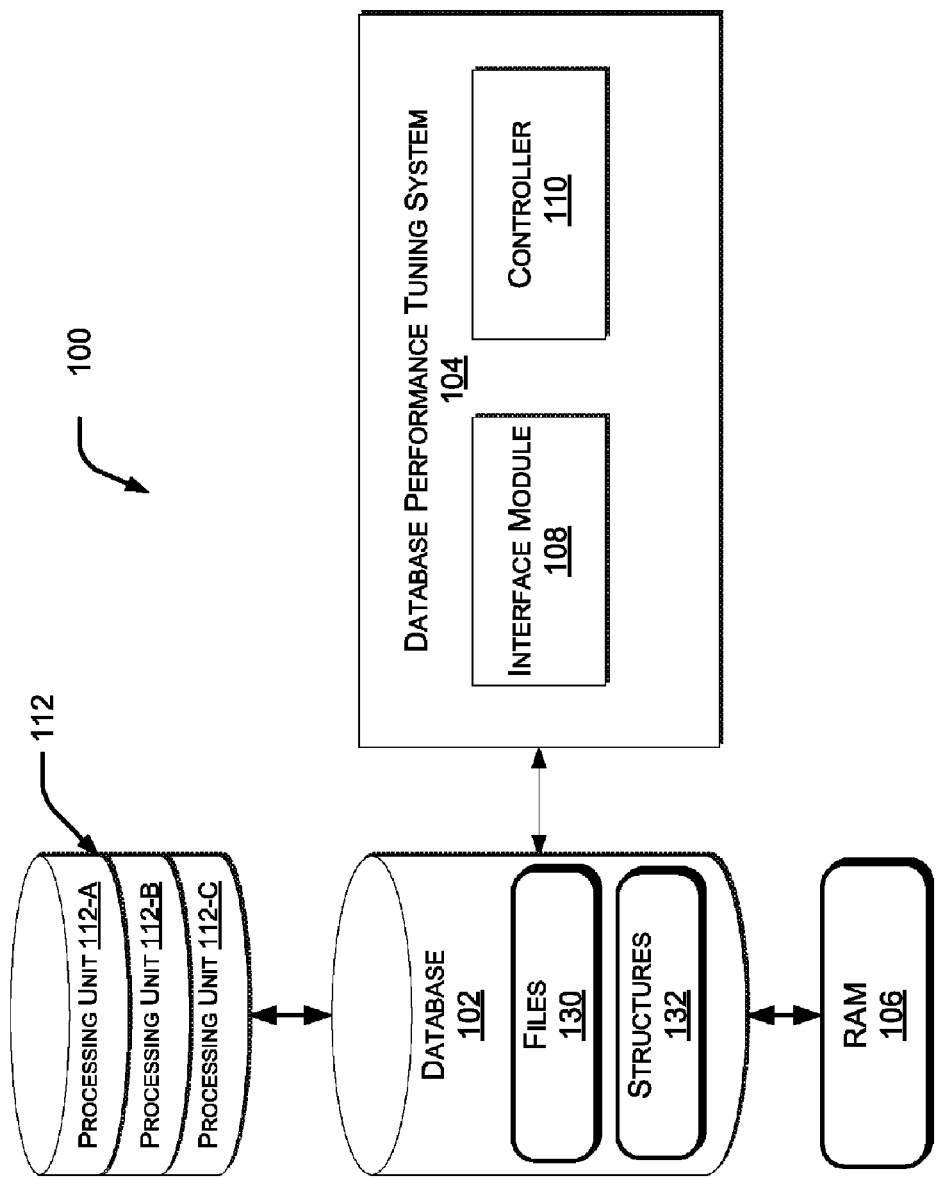
FIG. 1 illustrates an exemplary system for performance tuning a database.

While various modifications and alternative forms of the disclosed system and method are contemplated, specific exemplary embodiments are disclosed in the drawings and are described in detail herein. It should be understood, however, that the drawings and detailed description are not intended to limit the scope of the claims contained herein to the particular form disclosed, but on the contrary, the disclosure is intended to cover all modifications, equivalents, and alternatives falling within the spirit and scope of the present invention as defined by the appended claims.

DETAILED DESCRIPTION

The following detailed description is made with reference to the figures. Embodiments are described to illustrate the disclosed system and method, not to limit their scope. With the insight provided by the instant disclosure, those of ordinary skill in the art should recognize a variety of equivalent variations on the description that follows.

Overview

Embodiments of the present disclosure are directed to methods for tuning a database. The present disclosure effectively uses the database memory capacity to reduce the number of database input/output (I/O) requests and the associated I/O time. Consequently, elapsed time for batch processing and response time for online transaction processing are also reduced. The method includes tuning the value of one or more parameters associated with the database such that an optimum value for each parameter is achieved, resulting in overall performance optimization of the database. To this end, the method effectively utilizes the memory capacity associated with the database to accomplish a variety of tasks, including, without limitation, database memory management, database reorganization, and execution of sort routines.

In contemporary internet-enabled, customer-facing applications, customers have direct access to database systems to perform account queries. Customers expect sub-second response times from such systems. Embodiments of the present disclosure reduce the end-to-end response time and improve customer satisfaction levels. In addition, the methods and systems disclosed herein can be used to tune a database to reduce processor and I/O resources usage, thereby making a significant impact on the transaction throughput.

It should be noted that the description below does not set out specific details of manufacture or design of the various components. Those of skill in the art are familiar with such details, and unless departures from those techniques are set out, techniques and designs known in the art should be employed, and those in the art are capable of choosing suitable manufacturing and design details.

Description of Embodiments

FIG. 1 illustrates an exemplary system 100 for optimizing performance of a database 102. There, database 102 is operatively connected to a database performance tuning system 104 and a random access memory (RAM) 106. The tuning system 104 optimizes the performance of the database 102 using an interface module 108 and a controller 110. Further, the database 102 is operatively connected to multiple processing units 112-A, 112-B, 112-C (processing units 112).

Consider a scenario in which a customer uses a database (such as Unisys' Database Management System II ("DMS II") running on Unisys' ClearPath Libra MCP mainframes) which runs a healthcare insurance application for a number of brands. Such a database typically has a memory capacity of 3 gigabytes. In a hardware upgrade, the memory capacity of the MCP mainframes may be extended from 3 to 6 gigabytes. Increasing memory capacity generally makes more RAM available for the database, but the upgrade must be efficiently used to optimize the database performance. The following disclosure illustrates a mechanism to analyze memory usage of a database and apply the memory capacity in an efficient way for performance tuning.

The database 102 is a collection of information, organized so that it can be easily accessed, managed, and updated. The database 102 may be a Unisys™ proprietary database, such as Database Management System II (DMS II) also known as "Enterprise Database Server". Those in the art will appreciate that the database 102 can be any type of persistent storage, such as, for example, a relational database, a distributed database, a data warehouse, an end-user database, an operational database, a hypermedia database, an object-oriented programming database, or a combination thereof. Typically, data records or files such as sales transactions, product catalogs, inventories, and customer profiles are saved in the database 102. A user can make an interactive query, access information, or update the database 102 using Structured Query Language (SQL) or other available tools. To access information from the database 102, the user can also use a database management system (DBMS), which is a collection of programs that facilitate entering, organizing, and selecting data.

The database 102 includes files 130 and structures 132. The database 102 may also include tables. If the database features a relational structure, tables are linked to limit data duplication. The files 130 include a number of related records, and each record includes a number of related fields. For example, the database 102 may contain a file 130 that includes details (fields) about school pupils (records). The database 102 may also contain a data structure 132, a customized format for organizing and storing data. General data structure types include arrays, files, records, tables, and trees Data structures 132 may also include datasets and index sets, used to access data items within a dataset. Here, the dataset contains data items and the index set contains information on how to locate data items quickly. For example, a dataset could be a table containing records about pupils in a school, with each record having fields containing specific information such as the pupil's name, address, and the like. Each record then contains a unique field, such as an identification number, which is referred to as a key value for that record. The index set associates each key value with location information. Locations can be expressed absolutely, as in a physical location on a memory device, or relatively, as an offset from the beginning of the dataset, for example.

The RAM 106 is a memory device that stores data to meet the processing requests of the controller 110 as well as the processing units 112. The RAM 106 may reside within the database 102 or be external to the database 102. Statistics corresponding to the database 102 such as the processor utilization values, memory utilization values, I/O activity, and other database statistics are stored in the RAM 106. In addition, the RAM 106 also stores programs, such as, without limitation, an access routine, which optimizes the database performance; performance criteria specifying conditions under which the database efficiency is optimum; performance parameters to measure the database performance; and optimum values of the parameters. Those skilled in the art will appreciate that other similar memory media may also be used to tune the database performance. Memory devices that can access, store, and update the database 102 at a faster rate than the RAM 106 may also be used for database performance tuning. The terms "memory," "main memory," and "RAM" are interchangeably used through this disclosure.

The tuning system 104 varies the value of database performance parameters including a memory resident limit, a reblocking factor, number of memory buffers, a reorganization task limit, an allowed core value, memory residency specification, a memory size, a disk size, and other parameters known in the art. It should be understood that buffer is a portion of the RAM 106 used for temporary storage of data when a program or hardware device needs an uninterrupted flow of information.

The database performance tuning system 104 optimizes the performance of the database 102. The tuning system 104 uses the controller 110 to measure the performance parameters and database statistics corresponding to the database 102. Based on the measurement, the controller 110 iteratively varies the parameters to monitor the database performance. For each parameter value, the controller 110 evaluates an amount of RAM 106 available and an amount utilized. It also evaluates the utilization value of the processing units 112; the database 102 I/O activities, including the physical I/O-count and the logical I/O-count; and the elapsed time. When evaluating, the tuning system 104 identifies performance optimization techniques and optimum values of the performance parameters to tune the database 102. The tuning system 104 applies the optimum values and techniques, thereby optimizing the performance of the database 102. The interface module 108 provides database statistics as well the activity logs stored in the RAM 106. A user may tune the performance of the database 102 through the interface module 108 by selecting performance parameters, iteratively varying them, and monitoring database performance. The interface module 108 may include hardware as well as software components. The interface module 108 may be a graphical user interface (GUI), a web-based user interface, a command line interface, a touch user interface; a gesture interface, a intelligent user interface, a motion tracking interface; a multi-screen interface; a non-command user interface, a object-oriented user interface or other interface types known in the art. Processors such as the processing units 112 are operatively coupled to the database 102 for performing database operations such as accessing data, writing data, updating the database 102, and importing from an external database. These units may also perform database reorganization processes, database sorting processes, and database memory management. Multiple processing units 112 may simultaneously operate on the database in serial or parallel.

Exemplary Methods

Figure 2:
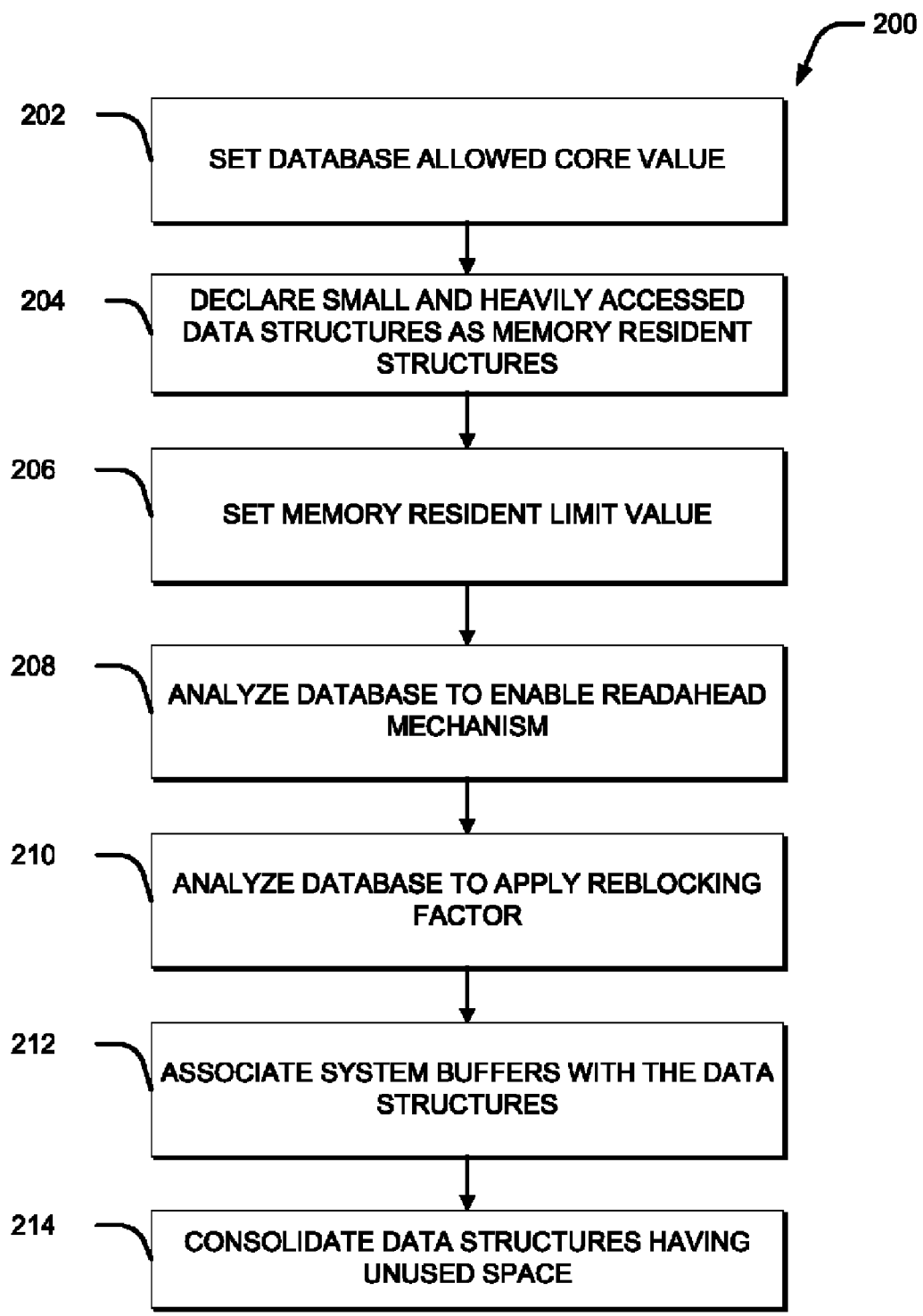
FIG. 2 is a flow chart illustrating an exemplary method for optimizing database memory management.

FIG. 2 illustrates an exemplary method 200 for optimizing database memory management. The method 200 may be implemented on the system 100 shown in the FIG. 1, among other devices. RAM 106 here is sized at 6 gigabytes. Those skilled in the art will appreciate that RAM capacity may vary based on database requirements. In the embodiments of the present disclosure, some of the method elements shown may be performed concurrently, in a different order than shown, or may be omitted. Additional method elements may be performed as desired.

At block 202, the tuning system 104 sets an allowed core value for the database 102. By setting that value, the tuning system 104 can control the amount of RAM 106 available for database buffers. Database statistics reporting a substantial number of forced overlays or an overlay rate higher than an overlay goal value indicates a demand for increased buffer memory. Factors affecting the allowed core value include, but are not limited to, design and architecture of the database 102 and total available RAM 106. The allowed core value may be set to a value between 500 megabytes and one-half the available memory. The controller 110 ensures that for setting the allowed core value, a required amount of the RAM 106 is available.

The allowed core value may be permanently set in a DASDL (Data and Structure Definition Language) description. DASDL is used to define the database 102 and includes a number of options such as the allowed core value. In addition, the allowed core value may be temporarily changed by changing the value online using Visible dbs. A user may effect a change in the layout of the database 102, database structures 132, database parameters, or database options by editing and compiling the DASDL. Visible dbs is used to dynamically change database options and parameters without re-compiling the DASDL.

At block 204, the tuning system 104 declares small and heavily accessed data structures 132 as memory resident structures. The memory resident structures are stored in the RAM 106 to reduce the access time for such structures 132. A user, such as a database administrator, can declare these structures 132 by using a database programming language (such as SQL), or using the interface module 108 to set or reset an option for 'Memory Resident.' Declaration of these structures 132 can also be done by the controller 110 by setting the option for 'Memory Resident.' The data structures 132 may be data sets, index sets, or a combination of both. The structures 132 having a size less than 25 megabytes are generally referred as small data structures. Also, the structures 132 for which the number of logical accesses and the number of physical PO's are a significant part of the total number of physical PO's on the database 102 are generally declared as heavily accessed data structures. Declaration for heavily accessed data structures is dependent on the database environment and the number of physical PO's requests executed on the database 102.

In an implementation, a customer using the Unisys™ proprietary database, structures having the number of logical accesses and physical PO's more than 100,000 read I/O's may typically be declared as heavily accessed data structures. On declaring the memory resident structures, buffers used by such structures remain in memory as long as a user of the structure does not close the database 102. Moreover, the buffers may stay in memory until the memory resident option is explicitly reset. As a result, the total number of physical I/O reads on such structures decrease significantly, as each block in the structure needs to be read only once. This, in turn, leads to a decrease in the total I/O time on the structure, batch elapsed time, and transaction response time.

At block 206, the tuning system 104 identifies an optimum memory resident limit value for the database 102. A significant RAM space defined as memory resident limit is allocated to certain data structures 132, which are referred to as memory resident structures. The resident limit value may be identified based on the size of memory resident structures and the size of the RAM 106. The memory resident limit value is set equal to a sum of the size of the individual memory resident structures of the database 102. If the sum is more than an allowed core value of the database 102, the lower value is specified for the memory resident limit as memory resident limit is maximized by the allowed core value of the database 102. Generally, the memory resident limit value between 0 and the database-allowed core value is an optimum value. On identifying the value, the tuning system 104 allocates an optimum amount of memory for the memory resident structures in the database 102. In an implementation, the memory resident limit value is set to 510 megabytes. As a result, every block in the structure 132 may be read only once, which decreases the total number of physical I/O reads on the structure 132. This leads to a decrease in the total I/O-time on the structure 132, a lower batch elapse time, and a reduction in the transaction response time.

Next, at block 208, the tuning system 104 analyzes the database 102 to determine whether read-ahead should be enabled for the data structures 132. The read-ahead mechanism may be used to read structures 132 that are accessed serially as well as in a random order. The read-ahead mechanism allows access routines to read blocks of data even before they are needed. So, the tuning system 104 retrieves a next physical block of data while accessing certain data sets. For accessing data records through a set or a subset, the tuning system 104 retrieves the next set or subset table as well as the data set records pointed to by entries in that set or subset table. The retrieved data set records are placed into the data buffers. This tuning block 206 reduces the time required to access records by decreasing buffer wait time, which in turn causes a decrease in total elapse time. The determination process to apply read-ahead may be based on parameters such as a ratio between logical and physical read-I/O's, and knowledge of the application. The tuning system 104 dynamically declares the number of buffers available for accessing structures 132 depending on the number of serial and random access users. For example, the number of buffers may be set according to the following equation:

$$\text{Number of Buffers} = 2 + 1 \text{ per random user} + 3 \text{ per serial user} \quad (1)$$

In a scenario with 3 random-access users and 5 serial users, 20 (2+1*3+3*5) data buffers are allocated in memory. Total size for all allocated buffers cannot exceed allowed core value. Those in the art will appreciate that at least two buffers are needed for the read-ahead mechanism. One buffer is used for processing and one is needed to read-ahead the next block of data.

At block 210, the tuning system 104 analyzes the database 102 to apply the reblocking factor for accessing the database 102. The tuning system 104 identifies and analyses serially and heavily accessed structures to apply reblocking mechanism. Such structures are generally identified when the number of read-aheads is high, which is usually high when it is more than 75% of read-count. The read-count is equal to the number of physical read I/O's, which may be determined from the database statistics log. Based on this determination, the tuning system 104 applies the reblocking mechanism to such structures.

The database 102 simultaneously maintains two block sizes for the same structure 132—one for random access and one for serial access. A smaller block is specified in a 'blocksize' option of the database 102. A larger block size is a multiple of a reblocking factor and the 'blocksize' option value. The tuning system 104 specifies a first block size, for a random access of a structure 132, as well as a reblocking factor. A user such as a database administrator may specify the blocksize value, a reblocking option (true/false) and the reblocking factor value for each and every data set using a database programming language such as SQL, or using the interface module 108. A second block size, which is obtained by the multiplication of the reblocking factor and the first block size, is used for accessing a structure 132 serially. The reblocking factor is generally set to a value between 1 and 60. The I/O time drives the value of the reblocking factor. An access time and a transfer time constitute the I/O time. The access time, which is equal to the sum of seek time and latency time, is same for a small block as well as a large block. But the transfer time for a large block is a reblocking factor higher than the transfer time for a small block. In an implementation, the reblocking factor value may be set to 20.

At block 212, the tuning system 104 assigns a default number of system buffers to each data structure 132. The default value may be computed based on a structure's buffer specification, the numbers of random and serial users. For example, the number of system buffers per structure may be set according to the following equation:

$$\text{Number of System Buffers per structure} = \begin{cases} K1 + U1 \text{ per random user} \\ K1 + U2 \text{ per serial user} \end{cases} \quad (2)$$

Where K1=number of system buffers;
U1=number of buffers per random user;
U2=number of buffers per serial user If the 'Overlaygoal' option of the database 102 is set to a positive value, the tuning system 104 ignores the buffer specification and uses the database software, stored in the RAM 106, to determine the number of system buffers. The database software dynamically tunes to the most optimal number of buffers. The default number of system buffers associated with each data structure 132 may be 1000, for example.

In some scenarios, assigning the default number of systems buffers at the tuning block 212 may not reduce the number of logical database accesses and the number of physical database PO's. This situation may arise when structures 132 have a large population. In such a scenario, the tuning system 104 may associate certain additional system buffers to very large and frequently accessed structures 132. The additional buffers are assigned to data structures 132 based on the size and access frequency for a data structure 132. The number of system buffers for such structures 132 is generally set in the range 1,000 to 20,000. For example, the number of buffers may be set according to the following equation:

$$\text{Number of Buffers} = \begin{cases} K2 + 1 \text{ per random user} \\ K2 + 2 \text{ per serial user} \end{cases} \quad (3)$$

where K2=number of system buffers.

At block 214, the tuning system 104 consolidates the data structures 132 having unused space or deleted records. Mostly, a large proportion of a structure's population includes deleted records. The tuning system 104 consolidates deleted or unused space returns this space to the database 102. The system can also consolidate disjoint index sequential sets or subsets online, keeping the database online and available. This tuning block 214 eliminates unnecessary I/O reads of deleted records during a sequential read through all the structures 132.

The database performance tuning blocks described above also include a number of iterative phases, in which each phase may include a number of activities such as measurement, analysis, recommendation, and implementation. The measurement activity measures the statistics for processor utilization, memory utilization, I/O activity and database statistics. Performance measurement tools (such as CP-Sampler Tool) known in the art may be used to measure the activity statistics. Moreover, to effectively measure and compare the statistics of database performance over time, following metrics may be used. The metrics include a ratio of physical database I/O count to number of logical database accesses; average I/O time per physical read and write I/O requests; and average I/O-time per logical database access.

The exemplary method 200 may be described in the general context of computer executable instructions. Generally, computer executable instructions can include routines, programs, objects, and the like, to perform particular functions or to implement particular abstract data types. The method 200 may also be practiced in a distributed computing environment where functions are performed by remote processing devices linked through a communications network. In that environment, computer executable instructions may be located in both local and remote computer storage media, including memory storage devices.

Figure 3:
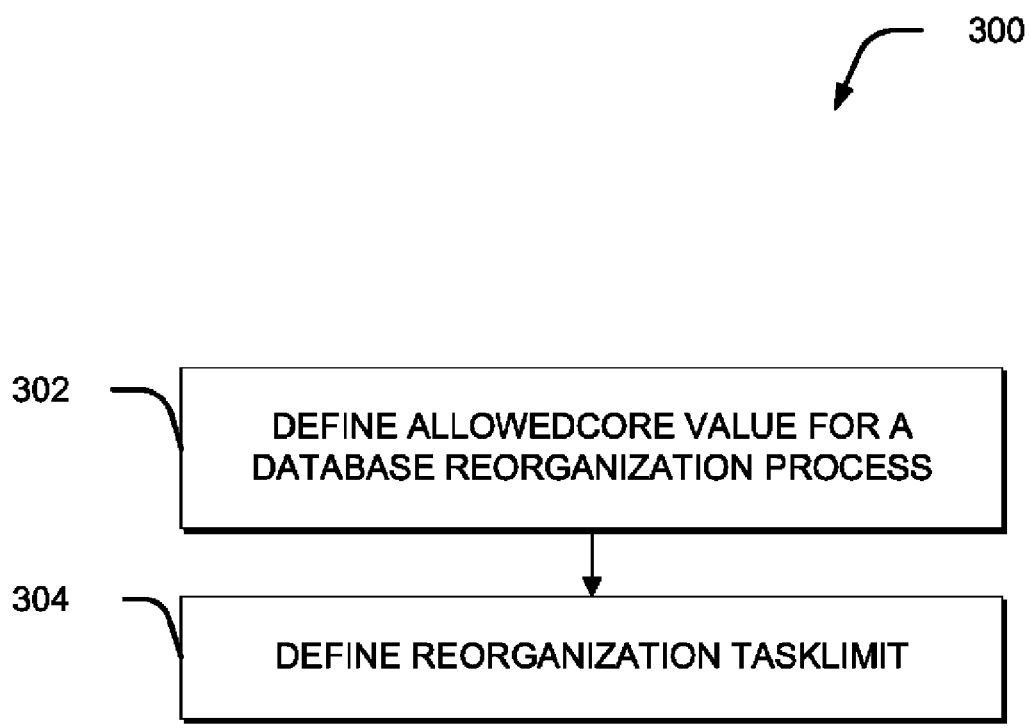
FIG. 3 is a flow chart illustrating an exemplary method for optimizing database reorganization processes.

FIG. 3 illustrates an exemplary method 300 for optimizing database reorganization processes. The tuning system 104 may use the memory capacity associated with the database 102 to optimize the database reorganization process. To this end, the method 300 may include the following tuning blocks in addition to the tuning blocks 202 to 214 of the method 200.

At block 302, the tuning system 104 declares reorganization-allowed core value for a reorganization process where a data structure 132 is sectioned over two or more sections. Generally, data structures 132 contain millions of records. In a specific scenario where a customer runs a healthcare insurance application for a number of brands, the database 102 (such as Unisys' ClearPath Libra MCP mainframes) includes a structure containing 300 million records. On splitting the data structures 132, index sets that span structures 132 must be reorganized. In that process, all entries in the index sets are updated to refer to new record locations. This process uses a fixup file created during the split process. The fixup process can consume considerable time, especially for data structures 132 with large populations, and many spanning sets, due to the number of random I/O reads. Declaring an optimum allowed core value allows the fixup file to be completely loaded into memory, which results in a decrease in the number of I/O reads. The allowed core value and a reorganization tasklimit are set based on a data structure population; number of index sets for the data structure 132; or the number of available processing units 112. The tuning system 104 determines the allowed core value using the following equations:

$$TL = \text{Number of index sets on a structure} \quad (4)$$

$$\text{Reorganization Allowed core} = 2*DP*TL \text{ words} \quad (5)$$

where DP=Total Data structure Population;
TL=Reorganization Tasklimit

The reorganization tasklimit is defined as the number of parallel fixup processes, which is the number of index sets that must be fixed up. A total data structure population includes the valid data structure records as well as the number of deleted records. The reorganization allowed core value is twice the multiplication result of the total data set population and the reorganization tasklimit. Usually, the allowed core value is set to be more than the calculated value by 5 percent to ensure that the required RAM 106 is allocated. The database statistics may not show the exact population value as the value could have been logged at an earlier time. The population may have grown to a higher value at the current time of setting the allowed core value. In an implementation, the allowed core value for the reorganization process may be set to 2.7 gigabytes.

The controller 110 checks whether the required RAM 106 is available for the determined allowed core value. The RAM 106 should at least have space for the number of words that are twice the total data structure population. If the required RAM 106 is unavailable, the tuning system 104 declares a value for the allowed core lower than the value determined from equation 4. The controller 110 determines the required memory (RM) using the following equation:

$$RM=DP*2 \text{ words} \qquad (6)$$

At block 304, the tuning system 104 specifies an optimal value for the reorganization tasklimit as well as the allowed core for all the reorganization processes. The reorganization tasklimit is set between 1 and twice the number of processing units 112. In an embodiment of the present disclosure, the tuning system 104 defines the reorganization tasklimit equal to the number of configured processing units 112. The tuning system 104 sets the number of parallel executed tasks to between 1 and the number of index sets for the reorganized data set. So, one fix up task for each of the index sets is executed in parallel by the configured processing units 112. In addition, the reorganization allowed core value is set to the highest possible value. Allocating an optimal memory to the reorganization process and executing an optimal number of parallel reorganization tasks speed up the database reorganization process, especially for large populated data structures. In an implementation, the number of parallel executed tasks may be set to 6.

Figure 4:
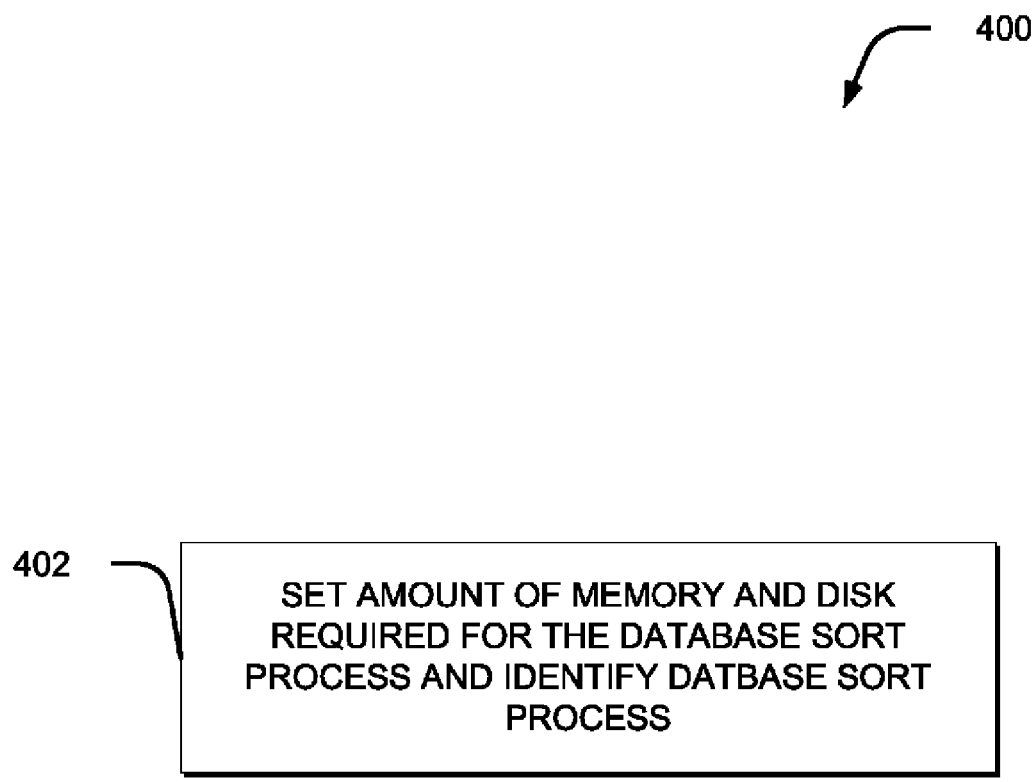
FIG. 4 is a flow chart illustrating an exemplary method for optimizing execution of sort routines.

FIG. 4 illustrates an exemplary method 400 for optimizing the execution of sort routines. The tuning system 104 may use the memory capacity associated with the database 102 to optimize database sorting processes. To this end, the method 400 may include the following tuning blocks in addition to the tuning blocks 202 to 214 of the method 200.

At block 402, the tuning system 104 sets an amount of memory and disk required for the database sorting process. The controller 110 checks the number of records in a file 130 to be sorted. Depending on the number of records in the file 130, a disksize value and a memorysize value is defined. Moreover, a sort in memory is used for the database sorting process. Usually, a memory sort is used when the files 130 to be sorted contain less than 65535 records. The tuning system 104 sets the amount of memory and disk based on the parameters which include a record length, a key length, or the number of records. The tuning system 104 determines the disksize value and the memorysize value using the following equations:

$$Disksize=0 \qquad (7)$$

$$Memorysize=(record\ length+key\ length+3)*Number\ of\ Records \qquad (8)$$

where the record length and key length are in words

Record length is the length of a record. Key length is the total length of all the key items in the record. For instance, consider a scenario where a file contains details (fields) about school pupils (records). Each record includes detailed information for a pupil. The fields include the name of a pupil (40 characters), the address (40 characters), and the key pupil-number (12 digits). Therefore, the record length will be 15 words (40+40+10=90 characters and 6 characters constitute a word). The key length will be 2 words (12 characters for the pupil-number).

If a memory sort is not valid, a disk/memory sort is used for the sorting process. In case the files 130 to be sorted contain more than 65535 records, a memory sort is not valid. In such a scenario, the tuning system 104 determines the disksize value and the memorysize value using the following equations:

$$Disksize=2.25*record\ length*Number\ of\ Records \qquad (9)$$

$$Memorysize=Max\ (400000, (Number\ of\ records*record\ length/16))+1500 \qquad (10)$$

In one implementation, the memory size for the sort process may be set to 112.5 megabytes and the disk size may be set to 4050 megabytes for a database file 130 having 10 million records.

Using the system and methods disclosed herein, the database performance tuning system 104 optimizes the performance of the database 102 by reducing the number of I/O requests and the I/O time on the database 102. In addition, the elapsed time for batch processing and the response time for online transaction processing are also reduced. The database performance is thus tuned for database memory management, database reorganization processes, and for the execution of sort routines. The specification has set out a number of specific exemplary embodiments, but persons of skill in the art will understand that variations in these embodiments will naturally occur in the course of embodying the subject matter of the disclosure in specific implementations and environments. It will further be understood that such variations, and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for performance tuning a database running on a computing system, the computing system comprising at least one processor and a first random access memory, the database having data structures, attributes, and files, the method comprising:

setting a database-allowed core value attribute between 500 megabytes and half size of the first random access memory for the database, the database-allowed core value representing the amount of the first random access memory which will be available to the database;

allocating to the database a first portion of the first random access memory corresponding to the database-allowed core value;

setting a memory resident limit value between 0 and the database-allowed core value for the database;

declaring small and heavily accessed data structures within the database as memory resident structures and storing the small and heavily accessed structures within the first portion of the first random access memory up to the memory resident limit value;

analyzing the database to determine whether read-ahead should be enabled for the data structures, the analysis comprising a review of a ratio of logical to physical read-I/O's used by the database;

analyzing the database to determine an appropriate reblocking factor between 1 and 60, and applying the reblocking factor to the database; and associating system buffers ranging from 1000 to 20000 with the data structures, the system buffers being stored in the first portion of the first random access memory.

2. The method of claim 1, the database includes a Data Management System II (DMS II) database.

3. The method of claim 1, wherein the size of the first random access memory is between 3 to 6 Gigabytes.

4. The method of claim 1 further comprising consolidating the data structures having unused space.

5. The method of claim 1, wherein the system buffers include a set of default buffers having a value set to 1000 per data structure.

6. The method of claim 5, wherein the system buffer includes a set of additional buffers assigned to data structures based on the size and access frequency of the data structures.

7. The method of claim 1, wherein the memory resident limit is selected based on the size of memory resident structures and the memory size.

8. The method of claim 7, wherein the memory resident limit is set to 510 megabytes.

9. The method of claim 1 further comprising setting a reorganization tasklimit between 1 and twice the number of processing units operating on the database reorganization process.

10. The method of claim 9 further comprising setting number of parallel executed tasks to between 1 and number of index sets for the reorganized data set.

11. The method of claim 10, wherein the number of parallel executed tasks being set to 6.

12. The method of claim 9 further comprising setting the allowed core value for the reorganization process to 2.7 gigabytes.

13. The method of claim 12, wherein setting the allowed core value and the reorganization tasklimit is based on:
   a data structure population;
   number of index sets for the data structure; or
   number of available processing units.

14. The method of claim 13, wherein the allowed core value is set to 2.7 gigabytes.

15. The method of claim 1 further comprising identifying the database sort process based on number of records in the database files.

16. The method of claim 15 further comprising setting the amount of memory and disk used for the database sort process based on a set of parameters.

17. The method of claim 16, wherein the set of parameters include:
   a record length;
   a key length; or
   the number of records.

18. The method of claim 16, wherein the memory size for the sort process is set to 112.5 megabytes for a database file having 10 million records.

19. The method of claim 16, wherein the disk size is set to 4050 megabytes.

* * * * *